A. A. MICHELSON.
RANGE FINDER.
APPLICATION FILED FEB. 24, 1912.
1,030,846.
Patented June 25, 1912.
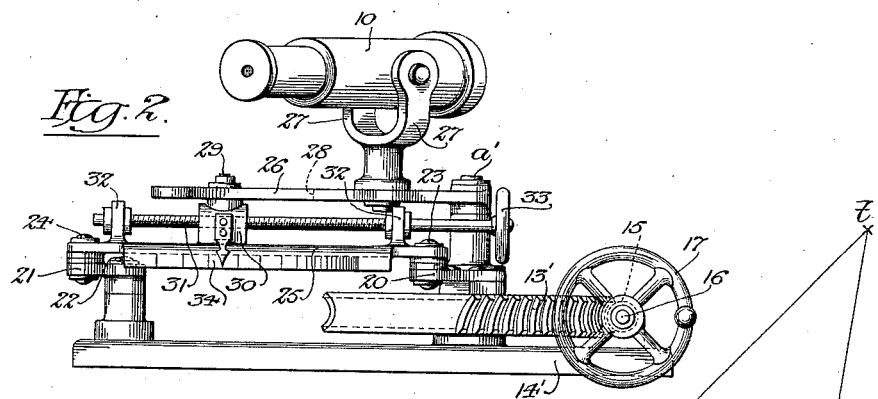
Fig. 2.
Fig. 1.
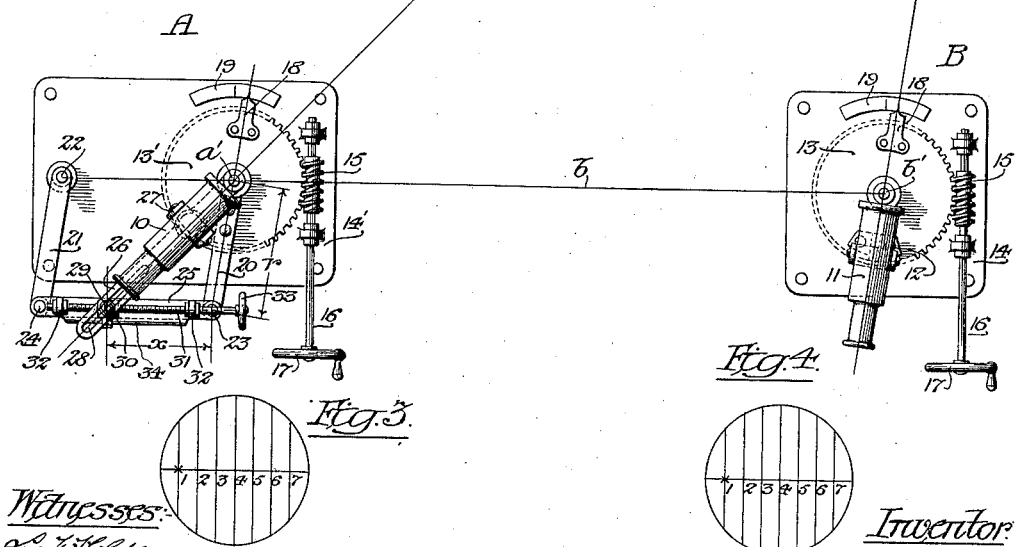
Fig. 3.
Fig. 4.
Witnesses:
Inventor:
Albert A. Michelson
By: Peirce, Fisher & Clapp
Attys.

UNITED STATES PATENT OFFICE.

ALBERT A. MICHELSON, OF CHICAGO, ILLINOIS.

RANGE-FINDER.

1,030,846.  Specification of Letters Patent.  Patented June 25, 1912.

Application filed February 24, 1912. Serial No. 679,600.

*To all whom it may concern:*

Be it known that I, ALBERT A. MICHELSON, a citizen of the United States, and a resident of Chicago, county of Cook, and State of Illinois, have invented certain new and useful Improvements in Range-Finders, of which the following is a specification.

The invention relates to range finders and seeks to provide simple and effective means for quickly determining the range in connection with two ray receiving or sighting instruments located at the opposite ends of a base line and both rotatable so that they may be directed toward a target without shifting the base line.

The invention consists in the features of improvement hereinafter set forth, illustrated in the preferred form in the accompanying drawings and more particularly pointed out in the appended claims.

In the drawings, Figure 1 is a plan view indicating the general construction and arrangement of the instruments at the opposite ends of the base line. Fig. 2 is a view in elevation of the instrument at one station and by which the range is indicated. Figs. 3 and 4 indicate the arrangement of the hair lines in the telescopes at the two stations.

The instruments A and B are located at the opposite ends of the base line $b$. These instruments may be mounted at fixed points on land or at different stations upon a vessel. For accurate determination of the range, it is desirable that the base line be as long as possible and, therefore, that the two instruments be located as far apart as convenient. The base line $b$ forms one side of a triangle, the other two sides of which meet at the distant target $t$.

Each station is provided with a ray receiving or sighting instrument and, in the form shown, telescopes 10 and 11 are employed. These telescopes are arranged to swing upon axes $a'$ and $b'$ at opposite ends of the base line $b$, as indicated, or at opposite ends of a line parallel to the base line. The observation telescopes 10 and 11 or like sighting devices in azimuth are rotatable, as stated, about the axes $a'$ and $b'$ and so that both may be readily directed upon the distant target $t$ without necessitating the shift of the base line $b$ which may be fixed, as when the instruments are on land, or shiftable, as when instruments are mounted upon a vessel.

The telescope or sighting device 11 at station B is, in the form shown, mounted upon a suitable support 12 which is fixed to a horizontal turn table or worm wheel 13. The latter is mounted upon a shiftable supporting base 14 to rotate about the axis $b'$. A screw 15 on a shaft 16 is arranged to engage the worm wheel 13. The shaft 16 is mounted, as indicated, in suitable bearings on the base plate 14 and at one end is provided with a hand wheel 17 by which the worm wheel 13 and telescope 11 may be rotated and thus brought to bear upon the target. The turn table is provided with a pointer 18 which is arranged to coöperate with a scale-piece 19 on the base plate 14 to indicate the zero position of the instrument, for example, the position of the instrument in which the optical axis of the telescope 11 is at right angles to the line $b$.

The instrument at the station A is provided with a similar turn table or worm wheel $13'$ which is rotatable about the axis $a'$ at the end of the base line $b$ and which is driven, in a similar manner, by a worm 15 on the shaft 16. The turn table $13'$ is also provided with a pointer 18 and scale 19 to indicate the zero position of the instrument. The turn table or worm wheel $13'$ at station A is provided with a radial arm or member 20 fixed thereto. In the zero position of the instrument A this arm is at right angles to the base line $b$ and, hence, is parallel to the telescope 11 at station $b$ when the latter is in zero position. A second, parallel motion arm or link 21 is mounted on the base plate 14 to swing about an axis 22 and the ends of the arms 20 and 21 are connected by pivots 23 and 24 to the ends of a parallel motion member 25. The arms 20, 21 and the member 25 are similar to the parts of a parallel ruler, that is to say, the arms 20 and 21 are of the same length and the distance between the pivots 23 and 24 is equal to the distance between the axes $a'$ and 22 of the arms. These axes are mounted upon a line which, as shown, coincides with the base line $b$, or the axes of the arms, if desired, could be arranged on a line parallel to the base line $b$. The connecting member 25 is thus at all times maintained parallel to the base line.

The telescope or sighting instrument 10 of instrument A is not fixed to the turn table or worm wheel $13'$, but is mounted upon an independently movable arm 26.

This arm is mounted to swing upon an axis which is located on a line extending through the axes $a'$ and 22 and preferably, as shown, the axis $a'$ is common to the arm 20 and the arm 26. As shown, the arm 26 is provided with an upwardly projecting post 27 upon which the telescope 10 is mounted with its optical axis intersecting the axis $a'$.

The arm 26, which carries the telescope 10, intersects and is preferably connected to the parallel motion member between the arms or links 20 and 21 to shift therewith, but the arm and telescope are adjustable relatively to the parallel motion member to determine the range. In the form shown, the arm 26 is provided at its outer end with a longitudinal slot 28 and a pivot 29 extending through the slot connects the arm to a nut 30 which is mounted to slide longitudinally on the member 25. An adjusting screw, engaging the nut, is rotatably mounted in suitable bearings 32 on the member 25. The screw is held against longitudinal movement relatively to the member 25, and at one end the screw is provided with an adjusting wheel 33.

In using the instrument, one operator is located at instrument B and one or more operators at instrument A. The operators are in telephonic communication. The operator at instrument B brings the telescope or sighting device 11 to bear upon some predetermined point of the target, and the operator of instrument A, or one of the operators at that instrument, by means of the hand wheel 17 maintains the parallel motion arms or members 20 and 21 parallel with the telescope 11. The worm wheels and screws of the instruments are identical and the operator at station B telephones, from time to time, the number of turns of the screws necessary to direct the telescope 11 upon a predetermined point of the target. The operator, or one of the operators at station A, by means of the wheel 33 maintains the sighting instrument 10 upon the same predetermined point of the target. Under such circumstances, the axis of the parallel motion arm or link 20 will be parallel to the line D from the distant target $t$ to the axis $b'$, and the member 25 will be parallel to the base line $b$. The triangle $a'$, $t$, $b'$ will, therefore, be similar to the triangle $a'$, 23, 29, and if D is the distance or range to be determined, $r$ the length of the arm 20, and $x$ the distance between the pivot 23 and the pin 29, then, $$\frac{D}{b} = \frac{r}{x}$$

and, $$D = \frac{br}{x}$$

but, as both $b$ and $r$ are fixed or constant, the range equals a known constant divided by the distance $x$ which can be measured. But, since D and $x$ are the only variables in the equation for determining the range, a scale for measuring the distance $x$ may be properly graduated to give a direct reading of the range. For this purpose, the parallel motion member 25 is provided with a scale 34 and an indicating mark or pointer on the nut 30 coöperates with the scale to give the range. Or, if desired, the scale could be associated with the hand wheel 33.

Preferably, each of the telescopes 10 and 11 is provided with a series of vertical, uniformly spaced hair lines, as indicated in Figs. 3 and 4. For convenience, these lines can be numbered. This arrangement would materially decrease the amount of adjustment of the telescopes or sighting instruments necessary in determining the range of a moving target. The operator at instrument B, instead of continually adjusting the telescope 11 to maintain a single hair line upon a predetermined point of the target, could inform the operator at station A when the predetermined point of the target is bisected by the different vertical hair lines of his instrument, and the latter operator, by adusting instrument A until the corresponding lines bisected the predetermined point of the target, could quickly determine the range. In this way with a relatively movable target, the amount of adjustment necessary for instrument A is greatly decreased and instrument B need only be adjusted when the target has passed out of the field of view.

It is obvious that numerous changes may be made in the details set forth without departure from the essentials of the invention as defined in the claims. For example, if desired and convenient, the rotatable members 13 and 13' at opposite ends of the base line $b$ could be connected together for unison movement and the instrument B could be provided with a reflector instead of a telescope or sighting instrument, as shown, for example, in United States Letters Patent No. 921,137, issued to myself on May 11, 1909. Such an arrangement would obviate the necessity of having an operator at station B.

I claim as my invention:—

1. In range finders, the combination with two ray receiving instruments mounted in azimuth at the opposite ends of a base line, of a parallel motion member, and arms whereon said member is mounted having their axes on a line coincident with or parallel to the base line, said parallel motion member being associated with one of said instruments and coöperating therewith to determine the range, substantially as described.

2. In range finders, the combination with two ray receiving instruments mounted in azimuth at the opposite ends of a base line, a swinging support for one of said instruments, a suitable base whereon said support is mounted, a parallel motion member, and arms pivoted on said base and carrying said parallel motion member, said arms and said swinging instrument support having their axes on a line coincident with or parallel to the base line, and said support being adjustable along said parallel motion member to determine the range, substantially as described.

3. In range finders, the combination with two sighting instruments rotatably mounted upon vertical axes at the opposite ends of a base line, of a swinging support whereon one of said instruments is mounted, a base whereon said support is mounted, a parallel motion member, and supporting arms therefor pivoted on said base and having their axes on said base line, said swinging support intersecting said parallel motion member and having a pin and slot connection therewith, and means for adjusting said support along said parallel motion member to direct the instrument thereon upon the target, substantially as described.

4. In range finders, the combination with two sighting instruments rotatably mounted upon vertical axes at the opposite ends of a base line, of a swinging support whereon one of said instruments is mounted, a base whereon said support is mounted, a parallel motion member, and supporting arms therefor pivoted on said base and having their axes on said base line, said swinging support intersecting said parallel motion member and having a pin and slot connection therewith, means for adjusting said support along said parallel motion member to direct the instrument on the support toward the target, and a scale associated with said adjusting means for indicating the range, substantially as described.

5. In a range finding instrument, the combination with a base, of a parallel motion member, arms carrying said member and pivotally mounted on said base, a support pivoted on said base in line with the axis of one of said arms and intersecting said parallel motion member, a sliding pin connecting said support and said parallel motion member, a sighting instrument mounted on said support, a scale on said parallel motion member coöperating with said sliding pin to determine the range, substantially as described.

6. In a range finding instrument, the combination with a base, of a parallel motion member having parallel arms pivoted to said base, a sighting instrument, a supporting arm for said sighting instrument pivotally mounted on said base with its axes in line with the axes of said parallel arms, a pin slidably mounted on said parallel motion member and engaging a longitudinal slot in said supporting arm, means for adjusting said pin along said parallel motion member, and a scale on said member for indicating the extent of adjustment of said pin, substantially as described.

7. In range finders, the combination with two sighting instruments rotatably mounted upon vertical axes at the opposite ends of the base line, of worm wheels and worms for rotating said instruments, one of said instruments being adjustable about its axis independently of the worm wheel therefor, a parallel motion member associated with the latter instrument and pivotally connected to the worm wheel thereof, means for maintaining said member parallel to the base line and a scale for indicating the extent of adjustment of said last mentioned instrument relatively to said parallel motion member, substantially as described.

ALBERT A. MICHELSON.

Witnesses:
 ELEANOR HAGENOW,
 KATHARINE GERLACH.

---

Copies of this patent may be obtained for five cents each, by addressing the "Commissioner of Patents, Washington, D. C."